United States Patent [19]

von Hatten

[11] Patent Number: 5,086,691

[45] Date of Patent: Feb. 11, 1992

[54] GAS COMPRESSION DEVICE HAVING ISOLATED COMPRESSION AND LUBRICATION CHAMBERS

[75] Inventor: Didier von Hatten, Strasbourg, France

[73] Assignee: Societe des Usines Quiri & Cie, Schiltigheim, France

[21] Appl. No.: 599,938

[22] Filed: Oct. 19, 1990

[30] Foreign Application Priority Data

Oct. 19, 1989 [FR] France ................... 89 13897

[51] Int. Cl.$^5$ ............................................. F15B 21/04
[52] U.S. Cl. ............................................ 92/83; 92/142;
  92/153; 92/168; 92/165 R; 184/24; 184/25;
  277/27; 277/59; 277/79
[58] Field of Search ................... 92/80, 83, 87, 142,
  92/153, 160, 165 R, 168 R, 155; 277/27, 59, 79;
  184/24, 25

[56] References Cited

U.S. PATENT DOCUMENTS

| | | | |
|---|---|---|---|
| 3,049,370 | 8/1962 | Bertrand | 92/165 R |
| 3,132,568 | 5/1964 | Strader | 92/168 |
| 3,549,154 | 12/1970 | Jones | 92/168 |
| 3,825,270 | 7/1974 | Paramonoff et al. | 277/15 |
| 3,902,404 | 9/1975 | Breit | 92/165 R |
| 4,093,240 | 6/1978 | Masuda et al. | 92/153 |
| 4,386,782 | 6/1983 | Reverberi | 92/168 |
| 4,483,141 | 11/1984 | Kobayashi et al. | 277/15 |

FOREIGN PATENT DOCUMENTS

| | | | |
|---|---|---|---|
| 649048 | 9/1964 | Canada | 277/59 |
| 1011281 | 6/1957 | Fed. Rep. of Germany | 184/24 |
| 2214320 | 10/1973 | Fed. Rep. of Germany | 277/59 |
| 3511969 | 10/1986 | Fed. Rep. of Germany | 184/24 |

OTHER PUBLICATIONS

*Encyclopendia of Modern Plastics*, p. 114, 1989.

Primary Examiner—Edward K. Look
Assistant Examiner—Thomas Denion
Attorney, Agent, or Firm—Schwartz & Weinrieb

[57] ABSTRACT

A high-performance, robust gas-compression device of long-term reliability is adapted in particular for storing nitrogen gas under compression, and includes a substantially cylindrical body (1), a piston (4) partially projecting into the gas-storage chamber (2), upper (7) and lower (6) piston guiding sleeves surrounding the piston, a lubrication chamber (9) formed in one of the guiding sleeves, adapted for holding a lubrication fluid for lubricating the guiding sleeves, and respective annular sealing joints (14, 19) which are accomodated in the guiding sleeves. One annular sealing joint is formed with an annular groove in communication with the principal gas-storage chamber, thereby exposing that sealing joint to a pressure prevailing in the principal gas-storage chamber; the other sealing joint is exposed to a constant pressure from the lubricating fluid. A subsidiary annular chamber (11) is a back-up of, concentric with in communication with the principal lubrication chamber (9), and is bounded by an upper portion of the lower guiding sleeve (6), and by an inner portion of the cylindrical body (1) so as to facilitate heat dissipation from the heated lubricating fluid disposed within the principal lubrication chamber (9).

12 Claims, 1 Drawing Sheet

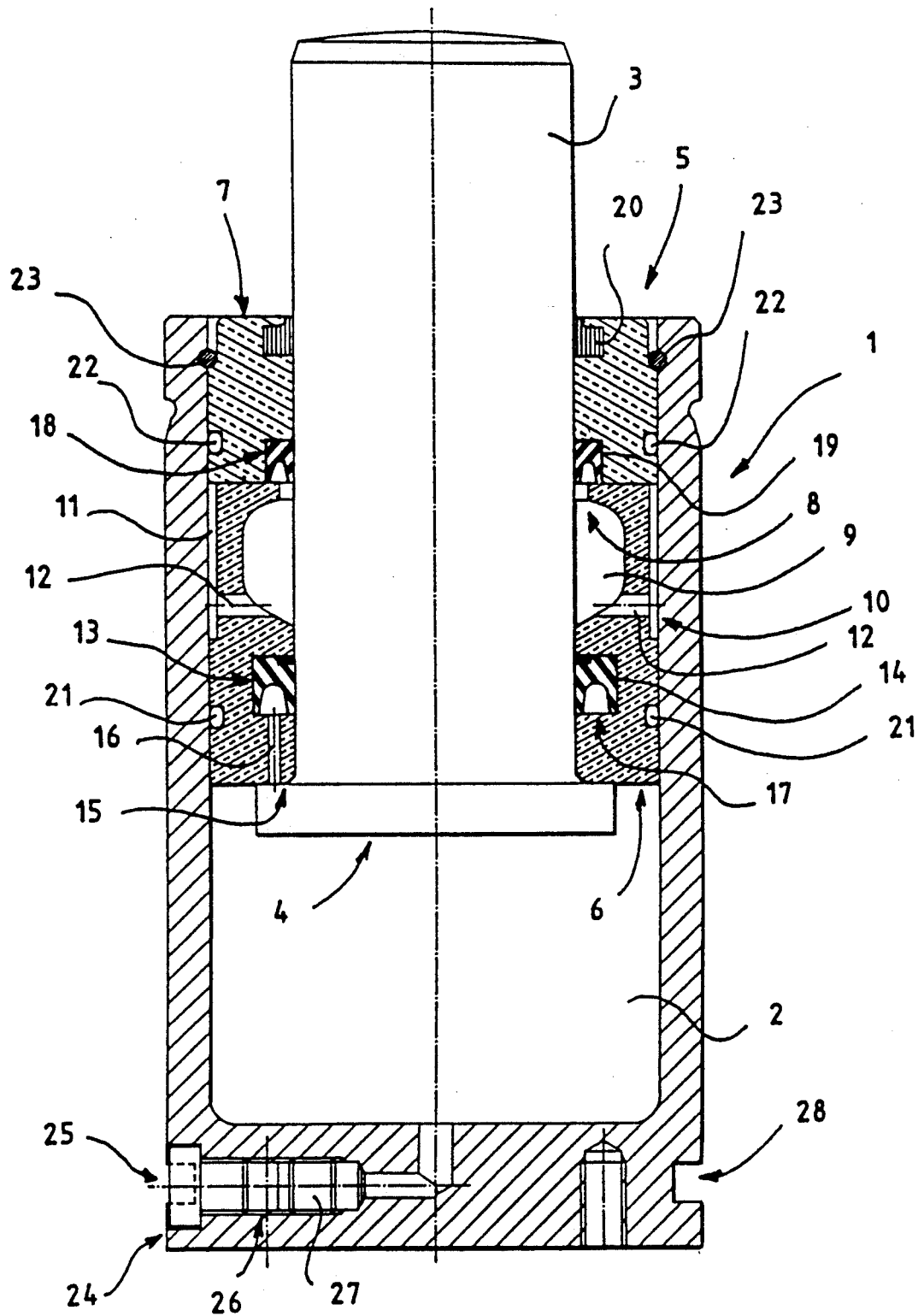

GAS COMPRESSION DEVICE HAVING ISOLATED COMPRESSION AND LUBRICATION CHAMBERS

FIELD OF THE INVENTION

The present invention relates to a high-performance gas compression device, and in particular to a long-lasting gas compression device with reinforced sealing.

It relates more particularly to a sealed assembly of long-term reliability for gas compression devices and the like.

BACKGROUND OF THE INVENTION

In industry gas compression devices, particularly compressed nitrogen gas devices, are used frequently for repetitive tasks, such as recall movements of slide blocks, or extraction of pieces stamped into, or lodged in industrial pressing tools.

The intensive use in an industrial environment of commercial mass-production methods necessitates a very considerable number of cycles of usage of such compression devices, frequently exceeding one million cycles. Furthermore the working conditions thereof are sometimes extreme, and it is therefore necessary that these devices be built robustly for long-term reliability.

This required robust long-term reliability must even exceed the conditions generally prevailing in these domains of industrial utilization.

The primary source of defects generally occurs in the area of sealing, the maintenance of which cannot be guaranteed completely for long time periods during intensive and extended utilization of the compressive device.

In fact, because of the sequential occurance of the work cycles, the partially soft sealing joint, with which the majority of compressive devices of the prior art are equipped, deteriorates and weakens quickly, and thus not only no longer provides a sufficiently adequate sealing integrity, but also ceases to provide a steady abutment for the piston in its extended position.

Even more recent compressive devices, which have joints of greater resistance, are vulnerable to damage by extrusion, which in turn leads quickly to a sealing defect.

Compressive devices of the aforedescribed kind then are no longer suitable, in that state, for being used for the intended application.

Furthermore the assembled body of the compressive device, called upon to perform intensive repetitive work, heats up excessively, which causes a pronounced decline in performance, and a more-or-less rapid deterioration of the assembly.

Additionally, on one hand, after a considerable number of working cycles, there occurs a diffusion of the nitrogen gas into the lubrication chamber, and, on the other hand, there take place multiple leakages of the lubrication liquid, which show up on the exterior of the compression device.

The gas compression device of the prior art thus no longer produces the force required of it, and furthermore malfunctions occasionally at the very time the desired element is produced, and in certain cases, because the faults are amplified, causes even a deterioration of the pressing tool.

OBJECTS OF THE INVENTION

It is one of the objects of the present invention to obviate the various inconveniences in proposing a high-performance, robust gas-compression device, which includes a sealing assembly of long-term reliability ensuring long-term usage in an industrial environment, and a rigorously constant travel of the piston.

For this purpose the high-performance, gas-compression device has a strengthened sealing of long-term reliability, each of the guiding sleeves contains an annular sealing joint formed with lips, and wherein the sealing joints have different respective shapes, and are made up of different respective materials. Furthermore the principal lubrication chamber is backed up by a subsidiary annular chamber concentric with the principal lubrication chamber and in communication therewith, and is bounded by an upper portion of the lower guiding sleeve, and by an inner portion of the cylindrical body; the lower sealing joint is formed with an annular groove in fluid communication with the principal gas-storage chamber, so as to expose the lower sealing joint to a pressure prevailing in the principal gas-storage chamber, while the other sealing joint is exposed to a constant pressure from the main lubrication chamber.

As has already been mentioned, the dual sealing system according to the present invention ensures a long-term usage, and results in an overall efficiency well above a threshold risking inoperability or malfunction of the equipment.

Furthermore, apart from the technical performance criteria, the sealing assembly, according to the present invention, makes use of simple components, which in turn results in the expectation of a very competitive net price. Furthermore, the piston travel always remains constant and identical.

The make-up of the gas compression device, according to the present invention, permits attainment of performance goals of exceptional long-term reliability.

Like-wise, the use of two annular lubrication chambers makes it possible to reduce the heating effect sufficiently so as to envisage a long-term intensive use of the device.

Additionally, the substantial augmentation of the sealing quality results from the communication between the chamber filled with compressed nitrogen gas, and the sealing lips of the lower internal joint, as well as from the presence of a second interior joint, placed near the outlet of the principal annular lubrication chamber.

Two joints external of the guiding sleeves further improve the sealing integrity of the lubrication liquid.

BRIEF DESCRIPTION OF THE DRAWINGS

The technical characteristics of the gas compression device of the present invention, and other advantages will be apparent from reading the description hereinbelow, which is given by way of a non-limiting example of one form of implementation of the invention, having reference to the annexed drawing in which:

The sole annexed drawing is a longitudinal section of the gas-compression device according to the present invention

DESCRIPTION OF THE PREFERRED EMBODIMENTS

The gas compression device, according to the invention, includes a generally cylindrical body 1 defining in its lower half-region a completely sealed gas-storage chamber 2 filled with compressed nitrogen gas.

An upper portion thereof includes a piston 3 terminated by a head 4, and a guidance assembly 5 made up of two bronze guiding sleeves or rings, namely a lower guidance sleeve 6, and an upper guidance sleeve 7.

The head 4 serves as an abutment for limiting the return movement of the piston 3 from its extended position.

A lower sleeve 6, which has a greater length, is open near its top, as evidenced by an annular passage 8 surrounding the piston 3 and defining in its upper portion a principal lubrication chamber 9, named a reservoir, which is concentric with the piston 3. Exteriorly of the lower sleeve 6 there is formed an annular recess 10, defining between the wall of the cylindrical body 1 and the lower sleeve 6 a subsidiary annular lubrication chamber 11, which is concentric with the principal lubrication chamber 9, and communicates therewith. The subsidiary annular lubrication chamber 11 is in fluid communication by way of several radial passages, such as by a passage 12, serving for the flow of a liquid, with the principal lubrication chamber 9. The subsidiary lubrication chamber 11 is closed by the lateral inner cylindrical surface of the body 1 of the compression device, which then forms its lateral outer wall.

The subsidiary chamber 11 is then a supplemental lubrication chamber of small width, communicates with the principal lubricating chamber 9, and is laterally closed by the inner cylindrical surface of the body 1. It facilitates heat dissipation of the heat emanating from the overheated lubrication oil, as a result of its intensive use.

The lower sleeve 6 is formed in a lower region around the piston 3, with an annular recess 13, which accomodates a first sealing joint 14, which is, for example a lip-type joint of a non-extrudable type. This sealing joint 14 is so places that its lips face the gas-storage chamber 2.

According to a novel characteristic of the invention, the lower sleeve 6 is formed with an axial communication channel 15 defined by a transmission passage 16 between the gas-storage chamber 2 containing the compressed nitrogen gas, and the aforedescribed sealing joint 14.

The axial communication channel 15 is in communication with a passage in the sealing joint 14, forming a lip opening 17 of the first sealing joint 14.

The supplemental pressure on the lips of the sealing joint 14 augments the sealing contact with the piston 3, and therefore improves its sealing integrity considerably.

The upper sleeve 7 is formed along its base with a circular groove 18 coaxial with the piston 3 for accomodating an upper sealing joint 19, which is also formed with lips, and is also of a non-extrudable type. As is the case for the first sealing joint, its lower face is formed with lips, and the latter face the gas-storage chamber 2 via the annular passage 8 of the principal lubrication chamber 9, which therefore communicates with an inter-lip space of the upper joint 19.

According to another novel characteristic of the invention, the sealing joints 14 and 19 have different respective dimensions, and are made of different respective materials. The upper sealing joint 19 is implemented, for example, by polyurethane, while the lower sealing joint 14 is made of acrylnitrilbutadene rubber, which is more supple than polyurethane.

The use of a rigid material for the upper joint, but a more supple material for the lower joint, and the different respective joint dimensions give rise to a difference which substantially improves resistance to heat, and in a general manner, enhances the long-term reliability of the gas compression device, according to the present invention.

An upper joint terminal 20, of a scraper type, disposed in an upper recess of the upper sleeve, serves to complete the sealing of the torroidal lower joint 21, as well as the upper torroidal joint 22, which joints are disposed in appropriate recesses provided in the lateral external surfaces of the lower and upper sleeves, respectively, and ensure the sealing of the subsidiary annular chamber 11, as well as that of the gas-storage chamber 2, on all of its sides with respect to the upper portion of the cylindrical body 1.

The upper sleeve is made immobile with respect to the cylindrical body 1 by a guard ring 23.

The cylindrical body 1 is terminated on its lower portion by a base 24, and is formed with a laterally located expandable orifice 25, which holds a valve body 26, accomodating in turn a valve 27.

A peripheral groove is formed in the base of the body 1 so as to permit affixation of the compressive device onto a tool, for example with the aid of two half loops.

The aforesaid invention has been described in detail hereinabove. It will nevertheless be understood that various simple modifications, addition, direct variants, and substitution of equivalent means are included in the scope of the present invention, which is defined by the annexed claims.

I claim:

1. A gas-compression device, comprising in combination:

a substantially cylindrical body;

a chamber formed within said cylindrical body for gas storage under pressure;

a piston partially projecting into said gas-storage chamber;

upper and lower piston guiding sleeves surrounding said piston;

a principal lubrication chamber being formed within one of said guiding sleeves and being adapted to hold a lubricating fluid, separate and distinct from said gas stored under pressure within said chamber, for lubricating said guiding sleeves;

a pair of annular sealing joints accomodated within said guiding sleeves, at least one of said annular sealing joints being formed with an annular groove in communication with said gas-storage chamber, thereby exposing said one of said sealing joints to a pressure prevailing within said gas-storage chamber, the other one of said sealing joints being exposed to a constant pressure from the lubricating fluid, said at least one of said pair of annular sealing joints isolating said principal lubrication chamber from said gas-storage chamber; and a subsidiary annular lubrication chamber defining communication between said principal lubrication chamber and said cylindrical body for facilitating heat dissipation from the lubricating fluid disposed within said principal lubrication chamber.

2. The gas-compression device according to claim 1, wherein said annular sealing joints are dissimilar from one another.

3. The gas-compression device according to claim 1, wherein each of said annular sealing joints is formed with lips.

4. The gas-compression device according to claim 1, wherein said one of said annular sealing joints is constituted by said annular sealing joints disposed within said lower piston guiding sleeve, and is formed with lips defining an interlip space therebetween, an axially directed passage communicating with said interlip space being formed between said lower sealing joint and said gas-storage chamber.

5. The gas-compression device according to claim 1, wherein said annular sealing joint disposed within said upper piston guiding sleeve is formed with lips defining an interlip space therebetween, said upper sealing joint having an annular abutment bordering said principal lubrication chamber, and said interlip space.

6. The gas-compression device according to claim 1, further comprising first and second torroidal joints fittingly interposed in respective annular grooves formed between said cylindrical body and said lower and upper sleeves respectively, and surrounding said subsidiary annular lubrication chamber along bottom and top portions thereof, respectively.

7. The gas-compression device according to claim 1, wherein an upper outer wall of said lower sleeve and an inner wall of said cylindrical body define respective inner and outer peripheral borders of said subsidiary annular lubrication chamber.

8. The gas-compression device according to claim 1, wherein said annular sealing joints have different respective shapes, and are made up of different respective materials.

9. The gas-compression device according to claim 1, wherein the annular sealing joint disposed within said upper piston guiding sleeve is made of polyurethane material.

10. The gas-compression device according to claim 9, wherein the annular sealing joint disposed within said lower piston guiding sleeve is made of rubber which is more supple than the polyurethane material of said upper annular sealing joint.

11. The gas-compression device according to claim 1, wherein said guiding sleeves are made of bronze.

12. The gas-compression device according to claim 1, wherein the other one of said sealing joints is exposed to a constant pressure from lubricating fluid in said lubricating chamber.

* * * * *